United States Patent Office 3,227,362
Patented Jan. 4, 1966

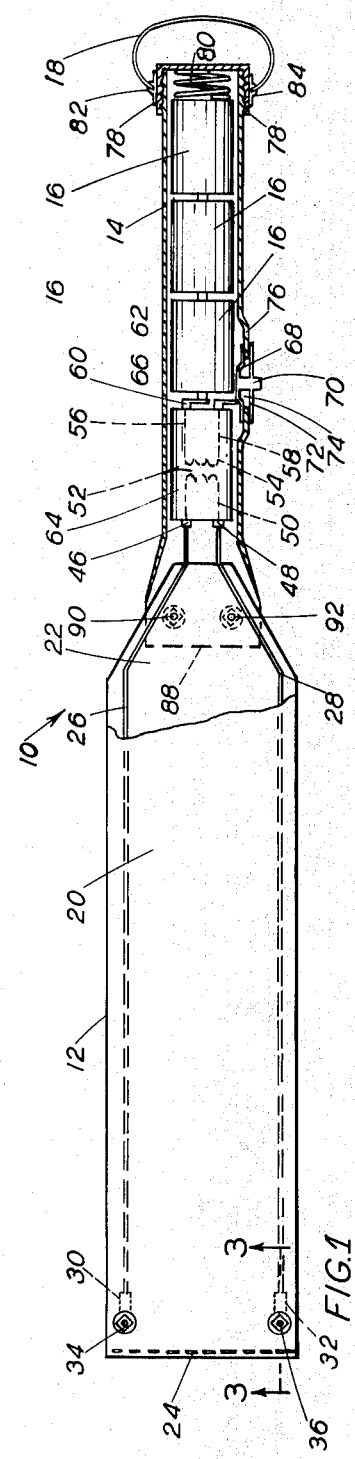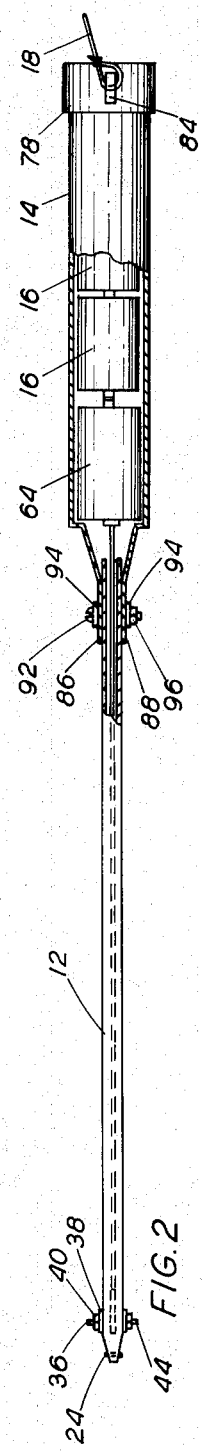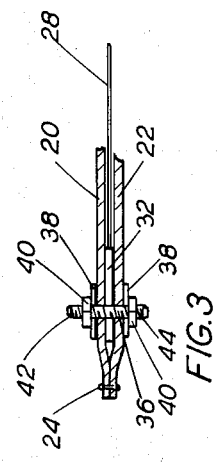

3,227,362
ELECTRIC SLAPPER
Perry H. Laten, 1945 N. Lincoln, Fremont, Nebr.
Filed Jan. 15, 1964, Ser. No. 337,839
1 Claim. (Cl. 231—2)

This invention relates to livestock shocking devices for driving stubborn hogs, cattle, and other stock, and more particularly it is an object of this invention to provide a device of this kind which is more versatile and effective.

Heretofore electrical livestock prods have replaced whips. Although whips and shocking prods have been successful to certain degrees, yet it is an object of this invention to provide a slapper for driving livestock which combines the effect of shocking with the effect of a flexible slapping blade so that these two effects are simultaneously applied to a stubborn animal for most effective motivation.

In the prior art, livestock prods of the shock-producing type have had a disadvantage in that when their batteries run low, their effectiveness diminishes suddenly. It is, therefore, an object of this invention to provide an electric slapper having a blade which is flexible and effective even when used as a slapper alone at times when its batteries run low. In this way, the new slapper avoids the danger of loss of power and resultant helplessness of an operator as could otherwise occur in the middle of an emergency in the handling of animals.

Although, theoretically, an operator could carry extra batteries and could also carry a whip to be used in case the batteries run low, the practical fact is that most operators will not do so, preferring to carry only one device. It is, therefore, an object to provide as that one device, the combination of a slapper and shocker of this invention.

A further object of the invention is to provide a slapper and shocker of economical construction.

It has been proposed heretofore to apply electric shocking means to a conventional whip. However, in contrast, I propose a slapper rather than a whip. The slapper I propose is adapted to engage an animal across the surface of the animal in such a way as to have a slapping effect as distinguished from a whipping effect for spreading the blow over an adequate area without the necessity of unnecessary excessive length, whereby a greater manual control is possible.

A particular object is to provide wires extending to shocking points which extend through the blade between protective layers of material rather than around the outside where they might be quickly worn away or become snagged.

Other and further objects and advantages of the present invention will be apparent from the following detailed description, drawings and claim, the scope of the invention not being limited to the drawings themselves as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claim.

In the drawing:

FIGURE 1 is a plan view of the electric slapper with parts broken away showing the connection of a blade of the slapper to a handle, and showing a longitudinal section through the handle.

FIGURE 2 is a side elevational view of the electric slapper, also with parts broken away showing the connection of a blade of the slapper to a tubular handle.

FIGURE 3 is a longitudinal section through one of the contact points of the slapper, taken on line 3—3 of FIGURE 1, and with the parts shown on an enlarged scale.

While one embodiment of the invention is illustrated in the above-referred-to drawing, it is to be understood that the drawing is merely for the purpose of illustration and that various changes in construction may be resorted to in the course of manufacture in order that the invention may be utilized to the best advantage according to circumstances which may arise, without in any manner departing from the spirit and intention of the invention, which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a flat blade of stitched cotton, canvas, or nylon, numeral 14 indicating a tubular handle having dry cells or batteries 16 therein, and numeral 18 indicating a loop of nylon cord providing a holder.

The blade 12 includes strips of material 20 and 22, the outer ends of which are secured together by stitches 24. Braided wires 26 and 28 are embedded in the edges of the blade and outer ends of the wires are provided with terminals 30 and 32 through which posts 34 and 36 extend. The terminals are provided with clips which are in contact with the posts, and the posts, which provide contact points, are provided with washers 38 and nuts 40. The ends of the posts extend beyond the nuts whereby upon striking an animal the points 42 and 44 engage the skin completing an electric circuit to the ground and imparting an electric shock to the animal.

The opposite ends of the braided wires 26 and 28 are connected by sockets 46 and 48 to one side 50 of an induction coil 52 the opposite side 54 of which is connected by wires 56 and 58 to contacts 60 and 62 extended from one end of a receptacle 64. The contact 60 is positioned to engage the center terminal 66 of one of the batteries 16, and the contact 62 is positioned to engage a contact bar 68 of a sliding switch button 70, the button extending through a sliding face plate 72 which is positioned over a slot 74 in a boss 76 on one side of the tube 14. By this means the electric current is only supplied for an instant, such as when one of the posts touches the skin of an animal, after which the button 70 is actuated to break the circuit to the batteries.

The tube 14 is similar to a conventional flashlight casing having a cap 78 and a spring 80, and the loop 18 is secured to ears 82 and 84 on the sides of the cap. The inner end of the tube 14 is flattened to facilitate connecting the tube or handle to the blade and, as shown in FIGURE 2, flat sections 86 and 88 of the handle are secured to the blade by bolts 90 and 92 on which are washers 94 and nuts 96. It will be understood that the blade may be secured to the handle by other suitable means.

It will be seen that this invention has a blade 12 which is formed of flexible material and which is flexible throughout major portions of its length.

Operation

With the parts assembled as illustrated and described and with a farmhand driving stock and holding the slapper by the handle with one hand an animal, such as a hog, is struck by the blade with the result that the contact points protruding from the sides of the blade engage the skin of the animal, causing an electric shock through the body of the animal.

The slapper may be used without applying the electric shock and when an animal, such as a stubborn hog, refuses to move the button 70 is moved forwardly completing a circuit through the induction coil, or other spark or shock producing means, whereby the animal receives the shock.

The slapper may be carried by the handle or loop, and the loop or thong may be of leather or other suitable material.

It will be seen that the blade is formed of two outer layers of material which protect the wires extending therebetween.

In operation, the blade will be found to be wide enough and long enough as to have a slapping effect whereby an adequate area of the animal's hide can be struck without the necessity for greater length as is the case with conventional whips, whereby the lesser length gives the possibility of greater manual control.

From the foregoing description, it is thought to be obvious that an electric slapper constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

A stock driving slapper comprising: a blade, a hollow handle extended from one end of said blade, electric batteries in said handle, contact points protruding from a side of the blade, a shock-producing induction coil, wires electrically connecting said coil and said points, means connecting said coil to said batteries, said flexible blade being sufficiently flat on major portions of two sides thereof as to engage an animal across a surface thereof of such width and length as to have a slapping effect, said blade being formed of flexible material and being flexible throughout major portions of its length, said blade being formed of two outer layers of said material, means securing said layers of material together, said wires extending between and being protected by said layers of material, whereby an animal will receive a shock between the contact points upon striking the animal with the slapper.

References Cited by the Examiner

UNITED STATES PATENTS

| | | | |
|---|---|---|---|
| 1,140,365 | 5/1915 | Dixon | 231—2 |
| 2,561,122 | 7/1951 | Juergens | 231—2 |
| 2,981,465 | 4/1961 | Bartel | 231—2 |

SAMUEL KOREN, *Primary Examiner.*

HUGH R. CHAMBLEE, *Examiner.*